(12) United States Patent
Takagi et al.

(10) Patent No.: US 10,196,961 B2
(45) Date of Patent: Feb. 5, 2019

(54) COOLING LIQUID CIRCULATION DEVICE FOR INTERNAL COMBUSTION ENGINE

(71) Applicants: TOYOTA JIDOSHA KABUSHIKI KAISHA, Toyota-shi, Aichi-ken (JP); AISIN SEIKI KABUSHIKI KAISHA, Kariya-shi, Aichi-ken (JP)

(72) Inventors: Noboru Takagi, Toyota (JP); Yasunobu Toyoda, Anjo (JP); Hirotaka Watanabe, Anjo (JP); Masazumi Yoshida, Handa (JP); Ryusuke Sasaki, Anjo (JP)

(73) Assignees: TOYOTA JIDOSHA KABUSHIKI KAISHA, Toyota (JP); AISIN SEIKI KABUSHIKI KAISHA, Kariya-shi (JP)

( * ) Notice: Subject to any disclaimer, the term of this patent is extended or adjusted under 35 U.S.C. 154(b) by 274 days.

(21) Appl. No.: 15/213,995

(22) Filed: Jul. 19, 2016

(65) Prior Publication Data

US 2017/0037771 A1    Feb. 9, 2017

(30) Foreign Application Priority Data

Aug. 4, 2015    (JP) .................................. 2015-153898

(51) Int. Cl.
*F01P 7/16*    (2006.01)
*F16K 15/18*   (2006.01)
(Continued)

(52) U.S. Cl.
CPC .................. *F01P 7/165* (2013.01); *F01P 5/10* (2013.01); *F01P 7/14* (2013.01); *F01P 7/162* (2013.01);
(Continued)

(58) Field of Classification Search
CPC ...... F01P 7/165; F01P 7/14; F01P 5/10; F16K 15/18; F16K 31/0651
See application file for complete search history.

(56) References Cited

U.S. PATENT DOCUMENTS 9,163,553 B2 *  10/2015  Matsusaka ................ F01P 7/14
2013/0240174 A1   9/2013  Matsusaka et al.

FOREIGN PATENT DOCUMENTS

EP    2607643 A1    6/2013
EP    2674587 A1   12/2013
(Continued)

OTHER PUBLICATIONS

U.S. Appl. No. 15/227,670, filed Aug. 3, 2016 in the name of Masazumi Yoshida, et al.

*Primary Examiner* — Kevin A Lathers
(74) *Attorney, Agent, or Firm* — Oliff PLC

(57) ABSTRACT

A device seating a valve body with the aid of an urging force of a spring by stopping the operation of a pump, changes over an energization state of a coil of at least one of the liquid shutoff valves which is changed over to the closed-valve state where the coil is energized, and then resumes the operation of the pump. Upon detecting the start of operation of the pump, a valve control unit causes a pump control unit to perform opening-closing force-feed control, where an amount of the cooling liquid force-fed by the pump is set to an amount within such a range that the valve body of the liquid shutoff valves whose coil is energized is not displaced in a valve-opening direction while the valve body of the liquid shutoff valves whose coil is not energized is displaced in the valve-opening direction.

4 Claims, 6 Drawing Sheets

(51) Int. Cl.
    *F16K 31/06*     (2006.01)
    *F01P 5/10*     (2006.01)
    *F01P 7/14*     (2006.01)
    *F02F 1/10*     (2006.01)
    *F02F 1/14*     (2006.01)
    *F02F 1/40*     (2006.01)
    *F01P 5/12*     (2006.01)

(52) U.S. Cl.
    CPC ................. *F02F 1/10* (2013.01); *F02F 1/14* (2013.01); *F02F 1/40* (2013.01); *F16K 15/18* (2013.01); *F16K 31/0651* (2013.01); *F01P 7/164* (2013.01); *F01P 2005/125* (2013.01); *F01P 2007/146* (2013.01); *F01P 2060/045* (2013.01); *F01P 2060/08* (2013.01); *F02F 2001/104* (2013.01); *F16K 31/0658* (2013.01)

(56)     References Cited

FOREIGN PATENT DOCUMENTS

| | | |
|---|---|---|
| JP | 2013-024186 A | 2/2013 |
| JP | 2013-108398 A | 6/2013 |
| JP | 2013-525653 A | 6/2013 |
| JP | 2014-025381 A | 2/2014 |
| WO | 2011/132530 A2 | 10/2011 |
| WO | 2012/108225 A1 | 8/2012 |

\* cited by examiner

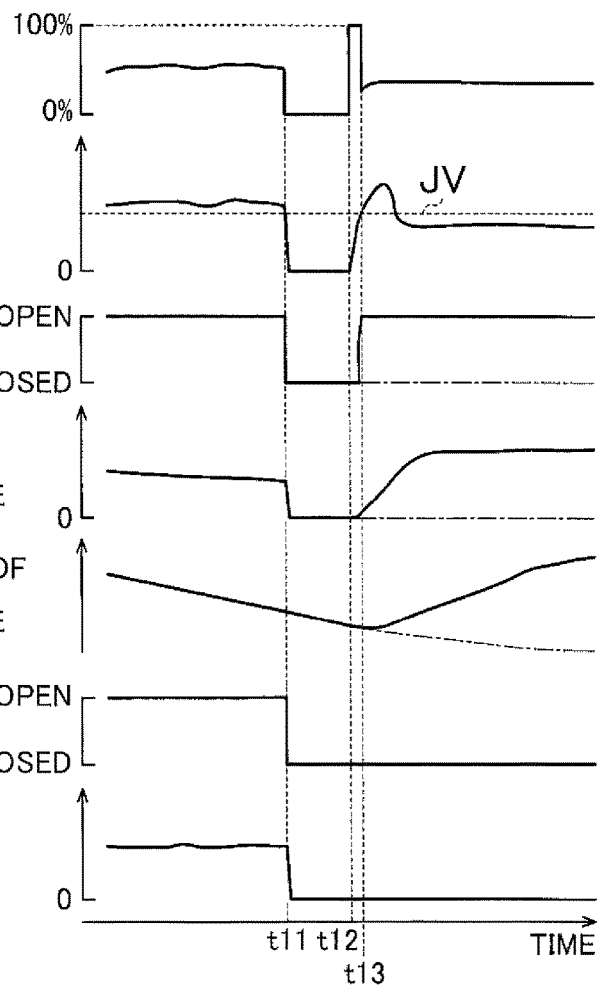

COOLING LIQUID CIRCULATION DEVICE FOR INTERNAL COMBUSTION ENGINE

INCORPORATION BY REFERENCE

The disclosure of Japanese Patent Application No. 2015-153898 filed on Aug. 4, 2015 including the specification, drawings and abstract is incorporated herein by reference in its entirety.

BACKGROUND

1. Technical Field

The present disclosure relates to a cooling liquid circulation device that circulates cooling liquid for an internal combustion engine.

2. Description of Related Art

A cooling liquid circulation device for an internal combustion engine has cooling liquid passages which are constituted by a water jacket and the like inside the internal combustion engine and through which cooling liquid circulates, an electric pump that force-feeds and circulates the cooling liquid in the cooling liquid passages, and control valves that are provided in the cooling liquid passages to block up the passages (see Published Japanese Translation of PCT Application No. 2013-525653 (JP 2013-525653 A)).

In the device of Published Japanese Translation of PCT Application No. 2013-525653 (JP 2013-525653 A), each of the control valves has a spring that constantly urges a valve body in a valve-closing direction, and an electromagnet that suctions the valve body in the valve-closing direction. This electromagnet has a core and a winding (a coil), and generates a magnetic force for suctioning the valve body in the valve-closing direction through energization of the coil. Besides, the valve body of each of the control valves is structured to be urged in a valve-opening direction by the flow momentum of the cooling liquid passing through the interior of each of the control valves.

A changeover from a state where the valve body of this control valve is unseated (an open-valve state) to a state where the valve body is seated (a closed-valve state) is made as follows. First of all, the operation of the pump is temporarily stopped, and the circulation of cooling liquid is stopped. Thus, the urging force that is applied to the valve body of each of the control valves in the valve-opening direction by the flow momentum of cooling liquid disappears, so the valve body is moved in the valve-closing direction and seated by an urging force of the aforementioned spring. Then, at this moment, the coil of each of the control valves is energized. Thus, the electromagnet of each of the control valves generates a magnetic force, so the valve body is held seated by a suction force resulting from this magnetic force. After that, the operation of the pump is resumed, and the circulation of cooling liquid is resumed. At this moment, although the valve body is urged in the valve-opening direction by the flow momentum of cooling liquid, the suction force of the electromagnet holds the valve body closed.

SUMMARY

It should be noted herein that the cooling liquid passages may be a plurality of liquid channels that are connected in parallel to one another, for example, a liquid channel that is provided with a heater core, a liquid channel that is provided with an ATF warmer and the like. Moreover, in the device having the plurality of liquid channels, it is conceivable to provide the liquid channels separately with the control valves.

In this cooling liquid circulation device, when the control valve that is provided in one of the liquid channels is closed with a view to stopping the delivery of cooling liquid to the liquid channel, the operation of the pump needs to be temporarily stopped. At this moment, the circulation of cooling liquid in the cooling liquid passages is stopped, so the valve bodies of all the control valves are displaced in the valve-closing direction and closed by the urging forces of the springs respectively.

When the energization of the coil of each of the control valves is stopped, magnetization remains (residual magnetization occurs) in the core. Therefore, the valve body of at least one of the control valves whose coil is not energized, namely, at least one of the control valves that should be opened through the immediately following resumption of the operation of the pump is suctioned due to the aforementioned residual magnetization.

Accordingly, even in the case where the operation of the pump is resumed afterward, when the amount of cooling liquid force-fed through normal pump control is small, the flow momentum of cooling liquid is small. Therefore, the flow momentum may not be able to displace the valve body of at least one of the control valves whose coil is not energized in the valve-opening direction against the urging force of a spring member and the suction force resulting from residual magnetization of the electromagnet. Moreover, in this case, until the amount of cooling liquid force-fed through normal pump control becomes equal to such an amount that the aforementioned at least one of the control valves whose coil is not energized is opened through normal pump control, the control valve remains closed, so the cooling liquid circulation device does not perform a desired function.

The present disclosure has been made in view of such circumstances, and provides a cooling liquid circulation device for an internal combustion engine that can swiftly change over open-closed states of a plurality of control valves to their desired states by opening at least one of the control valves that should be opened and closing at least one of the control valves that should be closed.

According to one aspect of the present disclosure, there is provided a cooling liquid circulation device for an internal combustion engine. The cooling liquid circulation device includes a plurality of cooling liquid passages which are connected in parallel to one another and through which cooling liquid for the internal combustion engine circulates. The cooling liquid circulation device is equipped with a pump, control valves, and an electronic control unit. The pump is configured to force-feed cooling liquid in the cooling liquid passages at a variable flow rate. The control valves are provided separately in the plurality of the cooling liquid passages. Each of the control valves is configured to block up a corresponding one of the cooling liquid passages. Each of the control valves includes a valve body, a spring member and an electromagnet. The valve body is configured to be urged in a valve-opening direction by a flow momentum of cooling liquid. The spring member is configured to constantly urge the valve body in a valve-closing direction. The electromagnet includes a core and a coil, and is configured to generate a magnetic force for suctioning the valve body in the valve-closing direction. The electronic control unit is configured to (i) make a changeover between a state where the coil is energized and a state where the coil is not energized, (ii) stop operation of the pump and seat the valve body by an urging force of the spring member, in changing over each of the control valves from an open-valve state to a closed-valve state, (iii) change over an energization state at a time when the coil of each of the control valves changes over each of the control valves to the closed-valve state from the state where the coil is not energized to the state where the coil is energized, and resume operation of the pump, (iv) perform opening-closing force-feed control. The opening-closing force-feed control is a control for setting an amount of cooling liquid force-fed by the pump to a force-feed amount within such a range that the valve body of at least one of the control valves whose coil is energized is not displaced in the valve-opening direction while the valve body of at least one of the control valves whose coil is not energized is displaced in the valve-opening direction regardless of an operating state of the internal combustion engine, when the electronic control unit detects start of operation of the pump, and (v) control operation of the pump in accordance with the operating state of the internal combustion engine.

In the cooling liquid circulation device as described above, when one of the plurality of the control valves is selectively closed, the operation of the pump is stopped, and the circulation of cooling liquid is stopped, so all the control valves are first closed. Then, when the operation of the pump is resumed afterward, the valve bodies of all the control valves are urged in the valve-opening direction by the flow momentum of cooling liquid.

Then, according to the aforementioned cooling liquid circulation device, opening-closing force-feed control is performed in resuming the operation of the pump. Therefore, the amount of cooling liquid that is needed to displace the valve body of at least one of the control valves whose coil is not energized, namely, at least one of the control valves that should be opened in the valve-opening direction can be force-fed by the pump. Therefore, there is no need to wait until the amount of cooling liquid force-fed by the pump becomes equal to such an amount that the at least one of the control valves that should be opened is opened, through operation control of the pump corresponding to the operating state of the internal combustion engine (normal pump control). The valve body of the at least one of the control valves that should be opened is displaced in the valve-opening direction against the urging force of the spring member and the suction force resulting from residual magnetization of the electromagnet (specifically, the core thereof), by the urging force resulting from the flow momentum of cooling liquid. Thus, the at least one of the control valves can be swiftly opened.

In addition, the amount of cooling liquid force-fed by the pump at the time when the operation of the pump is resumed can be set to such an amount that the valve body of at least one of the control valves whose coil is energized, namely, at least one of the control valves that should be held closed is not displaced in the valve-opening direction, through the performance of opening-closing force-feed control. Therefore, although the urging force resulting from the flow momentum of cooling liquid is applied to the valve body of this control valve, the valve body can be held seated against this urging force, by the urging force of the spring member and the suction force resulting from the magnetic force generated by the electromagnet. Thus, the control valve can be held closed.

As described hitherto, according to the cooling liquid circulation device as described above, the open-closed states of the plurality of the control valves can be swiftly changed over to their desired states by opening at least one of the control valves that should be opened and closing at least one of the control valves that should be closed. In the aforementioned cooling liquid circulation device, the electronic control unit may be configured to control operation of the pump in accordance with the operating state of the internal combustion engine without performing the opening-closing force-feed control, when the electronic control unit detects the start of operation of the pump and the coils of all the control valves are energized.

According to the aforementioned cooling liquid circulation device, in the case where the coils of all the control valves are energized when the electronic control unit detects the start of operation of the pump, namely, in the case where there is no control valve that should be opened in resuming the operation of the pump and there is no need to perform opening-closing force-feed control, opening-closing force-feed control is not performed. Therefore, the opening-closing force-feed control can be restrained from being performed unnecessarily.

Besides, in the aforementioned cooling liquid circulation device, the electronic control unit may be configured to perform the opening-closing force-feed control by setting the amount of cooling liquid force-fed by the pump to a maximum amount of a variable range. Besides, the electronic control unit may be configured to set the magnetic force generated by the electromagnet at a time when the coil is energized, in such a manner as to generate a suction force that prevents the valve body of each of the control valves from being displaced in the valve-opening direction when the opening-closing force-feed control is performed.

According to the aforementioned cooling liquid circulation device, when opening-closing force-feed control is performed, the amount of cooling liquid force-fed by the pump is set to the maximum amount of the variable range. Therefore, the valve body of at least one of the control valves whose coil is not energized can be swiftly displaced in the valve-opening direction by the flow momentum of cooling liquid, and the at least one of the control valves can be swiftly opened. In addition, the magnetic force generated by the electromagnet is set in such a manner as to generate a suction force that prevents the valve body of at least one of the control valves whose coil is energized from being displaced in the valve-opening direction when opening-closing force-feed control is performed. Therefore, the at least one of the control valves whose coil is energized can be held closed when opening-closing force-feed control is performed.

Still further, in the aforementioned cooling liquid circulation device, the pump may be a rotary pump. The electronic control unit may be configured to, when a rotational speed of the pump reaches a predetermined rotational speed that is higher than an upper-limit of the rotational speed of the pump that allows the at least one of the control valves whose coil is not energized to be held closed, during performance of the opening-closing force-feed control, (i) stop performance of the opening-closing force-feed control, and (ii) control operation of the pump in accordance with the operating state of the internal combustion engine.

In the aforementioned cooling liquid circulation device, when the rotational speed of the pump reaches the predetermined rotational speed after the operation of the pump is resumed, the performance of opening-closing force-feed control is stopped and normal pump control is performed, on the assumption that the at least one of the control valves whose coil is not energized is not closed as long as normal pump control is performed. Thus, the performance of opening-closing force-feed control can be stopped at a timing when the adjustment of the amount of cooling liquid force-fed by the pump with a view to opening the at least one of the control valves whose coil is not energized becomes unnecessary.

Incidentally, when at least one of the control valves whose coil is not energized is temporarily opened as the operation of the pump is resumed, the distance between the electromagnet and the valve body of the at least one of the control valves becomes long, and the suction force that is applied to the valve body due to residual magnetization becomes small. Therefore, even when the amount of cooling liquid force-fed by the pump becomes small afterward, the at least one of the control valves is unlikely to be closed by the suction force resulting from residual magnetization. Therefore, even in the case where the performance of opening-closing force-feed control is stopped when the rotational speed of the pump reaches the predetermined rotational speed as in the case of the aforementioned device, the at least one of the control valves whose coil is not energized can be held open.

BRIEF DESCRIPTION OF THE DRAWINGS

Features, advantages, and technical and industrial significance of an exemplary embodiment of the present disclosure will be described below with reference to the accompanying drawings, in which like numerals denote like elements, and wherein:

FIGS. 6A, 6B, 6C, 6D, 6E, 6F and 6G constitute a timing chart showing exemplary execution modes of the control process of each of the liquid shutoff valves and the pump control process.

DETAILED DESCRIPTION OF EMBODIMENT

Figure 1:
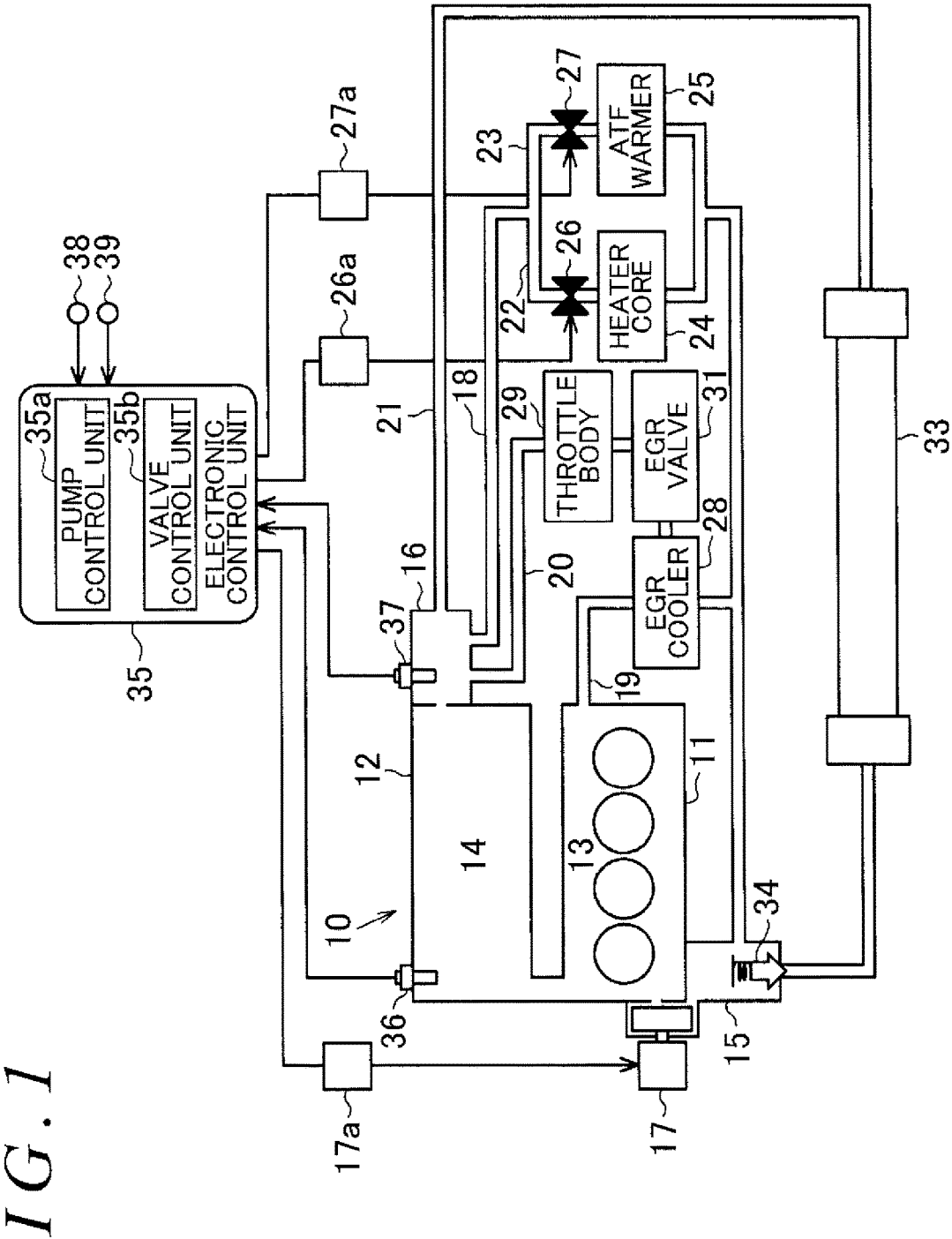
FIG. 1 is a skeleton view showing the schematic configuration of a cooling liquid circulation device according to the embodiment as an example of the present disclosure.

A cooling liquid circulation device according to the embodiment of the present disclosure will be described hereinafter. As shown in FIG. 1, water jackets (which will be referred to hereinafter as an in-block W/J 13 and an in-head W/J 14 respectively) are formed inside a cylinder block 11 of an internal combustion engine 10 and a cylinder head 12 of the internal combustion engine 10, respectively. This in-block W/J 13 and this in-head W/J 14 communicate with each other. Besides, the cylinder block 11 is provided with an inlet portion 15 that serves as an inflow port of the cooling liquid flowing into the in-block W/J 13. The cylinder head 12 is provided with an outlet portion 16 that serves as an outflow port of the cooling liquid flowing out from the in-head W/J 14. Moreover, the inlet portion 15 is provided with a rotary electric water pump 17 for force-feeding and circulating cooling liquid. This electric water pump 17 is designed as a variable flow rate-type pump in which the amount of the cooling liquid force-fed thereby increases as the rotational speed thereof increases.

In the present embodiment, in addition to the aforementioned in-block W/J 13 and the aforementioned in-head W/J 14, there are four channels as cooling liquid passages through which cooling liquid circulates. The four channels are a heater channel 18, a first cooler channel 19, a second cooler channel 20 and a radiator channel 21.

The heater channel 18 is formed in such a manner as to take out cooling liquid from the outlet portion 16 and return the cooling liquid to the electric water pump 17. Part of the heater channel 18 is constituted of two liquid channels 22 and 23 that are connected in parallel to each other. Moreover, one of the liquid channels 22 is provided with a heater core 24, and the other liquid channel 23 is provided with an ATF warmer 25. The heater core 24 is a heat exchanger for warming the air delivered to a vehicle interior by the heat of cooling liquid, and the ATF warmer 25 is a heat exchanger for warming ATF as hydraulic oil of an automatic transmission by the heat of cooling liquid. The liquid channel 22 is provided, in its inflow region of the cooling liquid flowing into the heater core 24, with a liquid shutoff valve 26 as a control valve, and the flow of cooling liquid through the heater core 24 can be selectively turned on-off through the opening-closing of the liquid shutoff valve 26. Besides, the liquid channel 23 is provided, in its inflow region of the cooling liquid flowing into the ATF warmer 25, with a liquid shutoff valve 27 as a control valve, and the flow of cooling liquid through the ATF warmer 25 can be selectively turned on-off through the opening-closing of the liquid shutoff valve 27. As described hitherto, in the present embodiment, the control valves are provided separately in the liquid channels 22 and 23.

Figure 2:
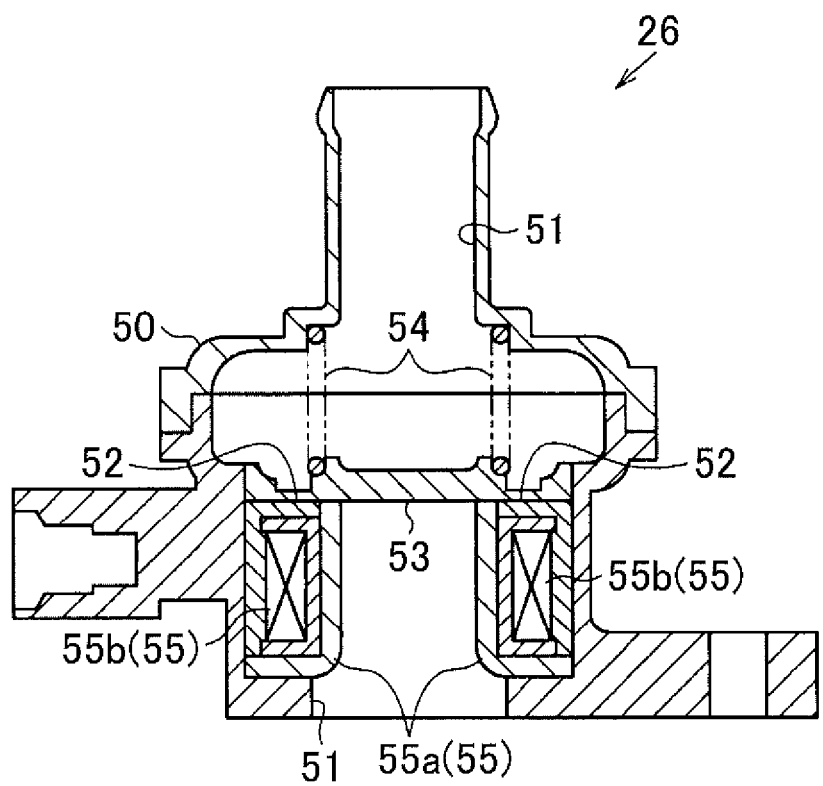
FIG. 2 is a cross-sectional view showing the internal configuration of each of liquid shutoff valves shown in FIG. 1.

As the liquid shutoff valves 26 and 27, those structured as follows are adopted. Incidentally, since the liquid shutoff valves 26 and 27 are identical in structure to each other, only the liquid shutoff valve 26 will be described hereinafter. As shown in FIG. 2, the liquid shutoff valve 26 is equipped with a housing 50. A cooling liquid channel 51 through which cooling liquid passes is formed inside the housing 50. A valve seat 52 is formed inside the cooling liquid channel 51, and a valve body 53 is disposed inside the cooling liquid channel 51.

The housing 50 is provided with a coil spring 54 as a spring member that constantly urges the valve body 53 in such a direction as to move toward the valve seat 52 ([a valve-closing direction] downward in FIG. 2). Besides, the housing 50 is provided with an electromagnet 55. The electromagnet 55 has a core 55a that is made of a soft magnetic material, and a coil 55b that assumes such a shape as to surround the core 55a. This coil 55b is energized by being supplied with an electric current from an external driving circuit (not shown). In the liquid shutoff valve 26, the electromagnet 55 generates a magnetic force through energization of the coil 55b, and the valve body 53 is suctioned in the valve-closing direction by the generated magnetic force.

The liquid shutoff valve 26 is attached to the heater channel 18 such that cooling liquid flows in the cooling liquid channel 51 in the opposite direction of the direction in which the coil spring 54 urges the valve body 53. In the liquid shutoff valve 26, therefore, when cooling liquid passes through the interior of the cooling liquid channel 51, the valve body 53 is urged in such a direction as to move away from the valve seat 52 ([a valve-opening direction] upward in FIG. 2) by the flow momentum of cooling liquid.

Figure 3A:
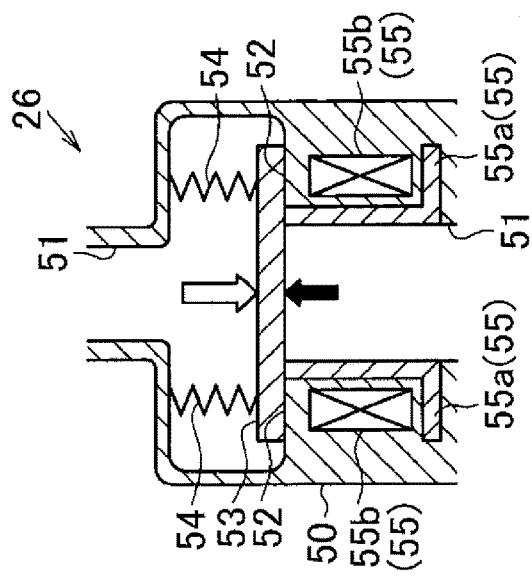
FIGS. 3A and 3B are schematic views each showing an exemplary operation mode of each of the liquid shutoff valves.

Moreover, as shown in FIG. 3A, when the liquid shutoff valve 26 is brought into a state where the valve body 53 is spaced away from the valve seat 52 (an open-valve state), the electric water pump 17 is operated with the coil 55b of the liquid shutoff valve 26 not energized. Thus, the valve body 53 is displaced in the valve-opening direction against an urging force of the coil spring 54, by an urging force (a black arrow in the drawing) resulting from the flow momentum of the cooling liquid flowing in the cooling liquid channel 51.

Figure 3B:
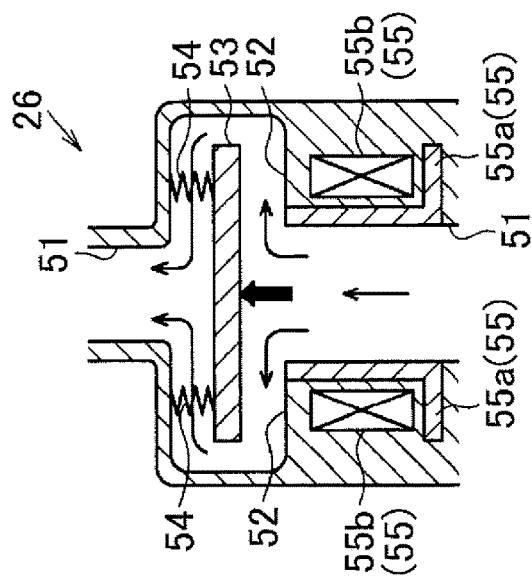

On the other hand, as shown in FIG. 3B, when the liquid shutoff valve 26 is changed over from the open-valve state to a closed-valve state (a state where the valve body 53 is seated on the valve seat 52), the operation of the electric water pump 17 is first stopped. Thus, the circulation of cooling liquid is stopped, so the valve body 53 of the liquid shutoff valve 26 is displaced in the valve-closing direction and seated on the valve seat 52 by the urging force of the coil spring 54. Besides, the energization state of the coil 55b of the liquid shutoff valve 26 is changed over from a state where the coil 55b is not energized to a state where the coil 55b is energized. Thus, the electromagnet 55 of the liquid shutoff valve 26 generates a magnetic force, so the valve body 53 of the liquid shutoff valve 26 is suctioned in the valve-closing direction by the magnetic force. Then, the operation of the electric water pump 17 is resumed afterward. At this moment, the valve body 53 is held at such a position as to be seated on the valve seat 52, against an urging force (a black arrow in the drawing) resulting from the flow momentum of the cooling liquid flowing in the cooling liquid channel 51, by an urging force of the coil spring 54 and a suction force of the electromagnet 55 (a blank arrow in the drawing). In this manner, the liquid shutoff valve 26 is changed over to the closed-valve state.

As shown in FIG. 1, the first cooler channel 19 is formed in such a manner as to take out cooling liquid from the in-block W/J 13 and return the cooling liquid to the electric water pump 17. The first cooler channel 19 is provided with an EGR cooler 28. The EGR cooler 28 is a heat exchanger for cooling the exhaust gas (EGR gas) recirculated into intake gas in the internal combustion engine 10 by cooling liquid.

The second cooler channel 20 is formed in such a manner as to take out cooling liquid from the outlet portion 16 and return the cooling liquid to the electric water pump 17 via the EGR cooler 28. The second cooler channel 20 has a cooling liquid passage for cooling (or warming) a throttle body 29 in which a throttle valve is built, and a cooling liquid passage for cooling (or warming) an EGR valve 31 that adjusts the amount of EGR gas. Moreover, the second cooler channel 20 is connected, at a downstream end portion thereof in a flow direction of cooling liquid, to the EGR cooler 28.

The radiator channel 21 is formed in such a manner as to take out cooling liquid from the outlet portion 16 and return the cooling liquid to the electric water pump 17. The radiator channel 21 is provided with a radiator 33 and a thermostat 34. The radiator 33 is a heat exchanger for cooling cooling liquid through the exchange of heat with the air hitting the radiator 33. Besides, the thermostat 34 is a valve that autonomously opens-closes in response to the temperature of the cooling liquid flowing thereinto and that turns on-off the flow of cooling liquid through the radiator channel 21.

The cooling liquid circulation device configured as described above is equipped with an electronic control unit 35. The electronic control unit 35 has a central processing unit that carries out various computations, a read only memory in which programs and data for control are stored, and a random access memory that stores a computation result of the central processing unit and detection results of various sensors, The various sensors include an inlet liquid temperature sensor 36 that is provided in the in-head W/J 14 to detect a temperature of the cooling liquid that has flowed in from the aforementioned in-block W/J 13 (an inlet liquid temperature TI), and an outlet liquid temperature sensor 37 that is provided in the outlet portion 16 to detect a temperature of the cooling liquid that has just passed through the aforementioned in-head W/J 14 (an outlet liquid temperature TO). In addition, the various sensors also include an intake air amount sensor 38 for detecting an amount of air sucked into the internal combustion engine 10 (an intake air amount GA), a speed sensor 39 for detecting a rotational speed of an output shaft of the internal combustion engine 10 (an engine rotational speed NE), and the like.

Detection signals of the various sensors are input to the electronic control unit 35. Besides, the electric water pump 17 is connected to the electronic control unit 35 via a pump driving circuit 17a. The liquid shutoff valve 26 is connected to the electronic control unit 35 via a valve driving circuit 26a. The liquid shutoff valve 27 is connected to the electronic control unit 35 via a valve driving circuit 27a. The electronic control unit 35 performs operation control of the electric water pump 17 (pump control) and operation control of the liquid shutoff valves 26 and 27 (liquid shutoff valve control), based on detection results of the various sensors. In the present embodiment, the electronic control unit 35 is equipped with a pump control unit 35a that controls the operation of the electric water pump 17 in accordance with the operating state of the internal combustion engine 10, and a valve control unit 35b that makes a changeover between a state where the coil 55b of each of the liquid shutoff valves 26 and 27 is energized and a state where the coil 55b of each of the liquid shutoff valves 26 and 27 is not energized.

Pump control is basically performed as follows by the pump control unit 35a. First of all, a required outlet liquid temperature as a required value of the outlet liquid temperature TO is calculated in accordance with the operating state of the internal combustion engine 10 (the inlet liquid temperature TI, the outlet liquid temperature TO, the intake air amount GA, the engine rotational speed NE and the like). Then, through the use of a physical model of a cooling system through which cooling liquid circulates, a target value of a pump discharge flow rate QP (a target flow rate Tqp) for making the outlet liquid temperature TO coincident with the required outlet liquid temperature is calculated, and the operation of the electric water pump 17 is controlled in accordance with the target flow rate Tqp.

Incidentally, in the present embodiment, the driving force of the electric water pump 17 is adjusted based on a duty ratio of a command signal output from the pump control unit 35a. The aforementioned duty ratio is changed within a determined range, for example, "0 to 100%". The duty ratio of the command signal that is output increases as the target flow rate Tqp increases. This command signal is input to the pump driving circuit 17a. Moreover, as the duty ratio of the command signal increases, the electric power supplied to the electric water pump 17 by the pump driving circuit 17a is increased, and the driving force of the electric water pump 17 is increased.

Besides, liquid shutoff valve control is performed as follows by the valve control unit 35b. In liquid shutoff valve control, the open-valve state is basically determined as target operation states of the liquid shutoff valves 26 and 27. At this moment, a valve-opening signal is output to each of the valve driving circuits 26a and 27a, and each of the valve driving circuits 26a and 27a does not supply an electric current to the coil 55b of a corresponding one of the liquid shutoff valves 26 and 27. Therefore, the electromagnet 55 of each of the liquid shutoff valves 26 and 27 does not generate a magnetic force. Then, at this moment, the electric water pump 17 is operated by the pump control unit 35a, so cooling liquid flows in the cooling liquid passages. Therefore, the valve body 53 of each of the liquid shutoff valves 26 and 27 is urged and moved in the valve-opening direction by the flow momentum of cooling liquid, so the liquid shutoff valves 26 and 27 are opened. Thus, the heating performance through heat exchange in the heater core 24 is obtained, and the temperature of ATF is held appropriate through heat exchange in the ATF warmer 25.

It should be noted, however, that when the internal combustion engine 10 is operated in a cold state (e.g., when the outlet liquid temperature TO is equal to or lower than a predetermined temperature), the closed-valve state is determined as a target operation state of the liquid shutoff valve 26 of the liquid channel 22. At this moment, a valve-closing signal is output to the valve driving circuit 26a from the valve control unit 35b, and the valve driving circuit 26a supplies an electric current to the coil 55b of the liquid shutoff valve 26. Therefore, the electromagnet 55 of the liquid shutoff valve 26 generates a magnetic force, and suctions the valve body 53 of the liquid shutoff valve 26 in the valve-closing direction. Then, at this moment, the operation of the electric water pump 17 is temporarily stopped by the pump control unit 35a, so the circulation of cooling liquid in the cooling liquid passages is stopped. Thus, the valve body 53 of the liquid shutoff valve 26 is moved in the valve-closing direction and seated on the valve seat 52 by an urging force of the coil spring 54, and the valve body 53 is held seated on the valve seat 52 by a suction force resulting from a magnetic force generated by the electromagnet 55, so the liquid shutoff valve 26 is closed. When the liquid shutoff valve 26 is thus closed, the delivery of cooling liquid to the heater core 24 is stopped, and the temperature of cooling liquid is restrained from falling through heat exchange in the heater core 24. Therefore, the temperature of cooling liquid in the cooling liquid passages can be made high at an early stage. Therefore, an attempt to warm up the internal combustion engine 10 at an early stage can be made by high-temperature cooling liquid. Besides, an attempt to warm up the automatic transmission at an early stage can be made by swiftly raising the temperature of ATF.

Besides, when the temperature of cooling liquid becomes low due to the continuation of idling operation after the completion of the warm-up of the internal combustion engine 10, the closed-valve state is determined as a target operation state of the liquid shutoff valve 27 of the liquid channel 23. At this moment, a valve-closing signal is output to the valve driving circuit 27a from the valve control unit 35b of the electronic control unit 35, and the valve driving circuit 27a supplies an electric current to the coil 55b of the liquid shutoff valve 27. Therefore, the electromagnet 55 of the liquid shutoff valve 27 generates a magnetic force, and suctions the valve body 53 of the liquid shutoff valve 27 in the valve-closing direction. Then, at this moment, the operation of the electric water pump 17 is temporarily stopped by the pump control unit 35a, and the circulation of cooling liquid in the cooling liquid passages is stopped. Thus, the valve body 53 of the liquid shutoff valve 27 is moved in the valve-closing direction and seated on the valve seat 52 by an urging force of the coil spring 54, and the valve body 53 is held seated on the valve seat 52 by a suction force resulting from a magnetic force generated by the electromagnet 55, so the liquid shutoff valve 27 is closed. When the liquid shutoff valve 27 is thus closed, the delivery of cooling liquid to the ATF warmer 25 is stopped, and the temperature of cooling liquid is restrained from falling through heat exchange in the ATF warmer 25, so the temperature of cooling liquid in the cooling liquid passages can be made high. Therefore, the heating of the vehicle interior can be carried out through the use of high-temperature cooling liquid, and the heating performance can be restrained from decreasing.

As described above, in the cooling liquid circulation device according to the present embodiment, when one of the liquid shutoff valves 26 and 27, which are provided in the liquid channels 22 and 23 respectively, is closed to stop the delivery of cooling liquid to a corresponding one of the liquid channels 22 and 23, the operation of the electric water pump 17 is temporarily stopped. When the energization of each of the coils 55b is stopped, magnetization remains (residual magnetization occurs) in the electromagnet 55 (specifically, the core 55a) of a corresponding one of the liquid shutoff valves 26 and 27. Therefore, the valve body 53 of that one of the liquid shutoff valves 26 and 27 whose coil 55b is not energized, namely, that one of the liquid shutoff valves 26 and 27 which should be opened through the immediately following resumption of the operation of the electric water pump 17 is suctioned due to the aforementioned residual magnetization. Therefore, even in the case where the operation of the electric water pump 17 is resumed afterward, when the amount of the cooling liquid force-fed by the pump 17 through normal pump control is small, the flow momentum of the cooling liquid flowing in the cooling liquid passages is small. In some cases, therefore, the valve body 53 cannot be displaced in the valve-opening direction against the urging force of the coil spring 54 and the suction force resulting from residual magnetization of the electromagnet 55, by the flow momentum. In these cases, until the amount of the cooling liquid force-fed by the electric water pump 17 becomes equal to such an amount that each of the liquid shutoff valves 26 and 27 is opened through normal pump control (pump control corresponding to the operating state of the internal combustion engine 10), each of the liquid shutoff valves 26 and 27 remains closed. Therefore, the cooling liquid circulation device does not perform a desired function.

Thus, in the present embodiment, when the start of the operation of the electric water pump 17 is detected by the valve control unit 35b of the electronic control unit 35, opening-closing force-feed control is performed as part of pump control, by the pump control unit 35a of the electronic control unit 35. In this opening-closing force-feed control, the amount of the cooling liquid force-fed by the electric water pump 17 is set to an amount within such a range that the valve body 53 of that one of the liquid shutoff valves 26 and 27 whose coil 55b is energized is not displaced in the valve-opening direction while the valve body 53 of that one of the liquid shutoff valves 26 and 27 whose coil 55b is not energized is displaced in the valve-opening direction.

In opening-closing force-feed control, concretely, the amount (specifically, the target flow rate Tqp) of the cooling liquid force-fed by the electric water pump 17 is set to a maximum amount of a variable range. Moreover, the magnetic force generated by the electromagnet 55 of each of the liquid shutoff valves 26 and 27 is set in advance in such a manner as to generate a suction force that prevents the valve body 53 of each of the liquid shutoff valves 26 and 27 from being displaced in the valve-opening direction when this opening-closing force-feed control is performed.

In the cooling liquid circulation device according to the present embodiment, when one of the liquid shutoff valves 26 and 27 is selectively closed, the operation of the electric water pump 17 is stopped, and both the liquid shutoff valves 26 and 27 are first closed. Then, when the operation of the electric water pump 17 is first resumed afterward, the valve body 53 of each of the liquid shutoff valves 26 and 27 is urged in the valve-opening direction by the flow momentum of cooling liquid.

Then, when the operation of the electric water pump 17 is resumed, the amount of cooling liquid that is needed to displace the valve body 53 of the liquid shutoff valve whose coil 55*b* is not energized (hereinafter referred to as a liquid shutoff valve A), namely, the liquid shutoff valve A that should be opened in the valve-opening direction can be force-fed by the electric water pump 17. Therefore, there is no need to wait until the amount of the cooling liquid force-fed by the electric water pump 17 becomes equal to such an amount that the liquid shutoff valve A is opened through normal pump control. The valve body 53 of the liquid shutoff valve A that should be opened is displaced in the valve-opening direction against the urging force of the coil spring 54 and the suction force resulting from residual magnetization of the electromagnet 55, by the urging force resulting from the flow momentum of the cooling liquid flowing in the cooling liquid passages. As a result, the liquid shutoff valve A can be swiftly opened.

In addition, the amount of the cooling liquid force-fed by the electric water pump 17 at the time when the operation of the electric water pump 17 is resumed can be set to such an amount that the valve body 53 of the liquid shutoff valve whose coil 55*b* is energized (hereinafter referred to as a liquid shutoff valve B), namely, the liquid shutoff valve B that should be held closed is not displaced in the valve-opening direction. Therefore, although an urging force resulting from the flow momentum of cooling liquid is applied to the valve body 53 of this liquid shutoff valve B, the valve body 53 can be held seated on the valve seat 52 against the urging force, by the urging force of the coil spring 54 and the suction force resulting from the magnetic force generated by the electromagnet 55. As a result, the liquid shutoff valve B can be held closed.

As described hitherto, the cooling liquid circulation device according to the present embodiment makes it possible to swiftly change over the open-closed states of the liquid shutoff valves 26 and 27 to their desired states by opening the liquid shutoff valve A that should be opened and closing the liquid shutoff valve B that should be closed.

An execution procedure of liquid shutoff valve control and pump control in the case where at least one of the liquid shutoff valves 26 and 27 is closed will be described hereinafter. In this case, first of all, an execution procedure of a process regarding liquid shutoff valve control (a liquid shutoff valve control process) will be described with reference to FIG. 4. Incidentally, a series of processing procedures shown in a flowchart of FIG. 4 conceptually indicate the execution procedure of the liquid shutoff valve control process. The actual process is executed as interrupt handling on a predetermined cycle, by the valve control unit 35*b* of the electronic control unit 35.

Figure 4:
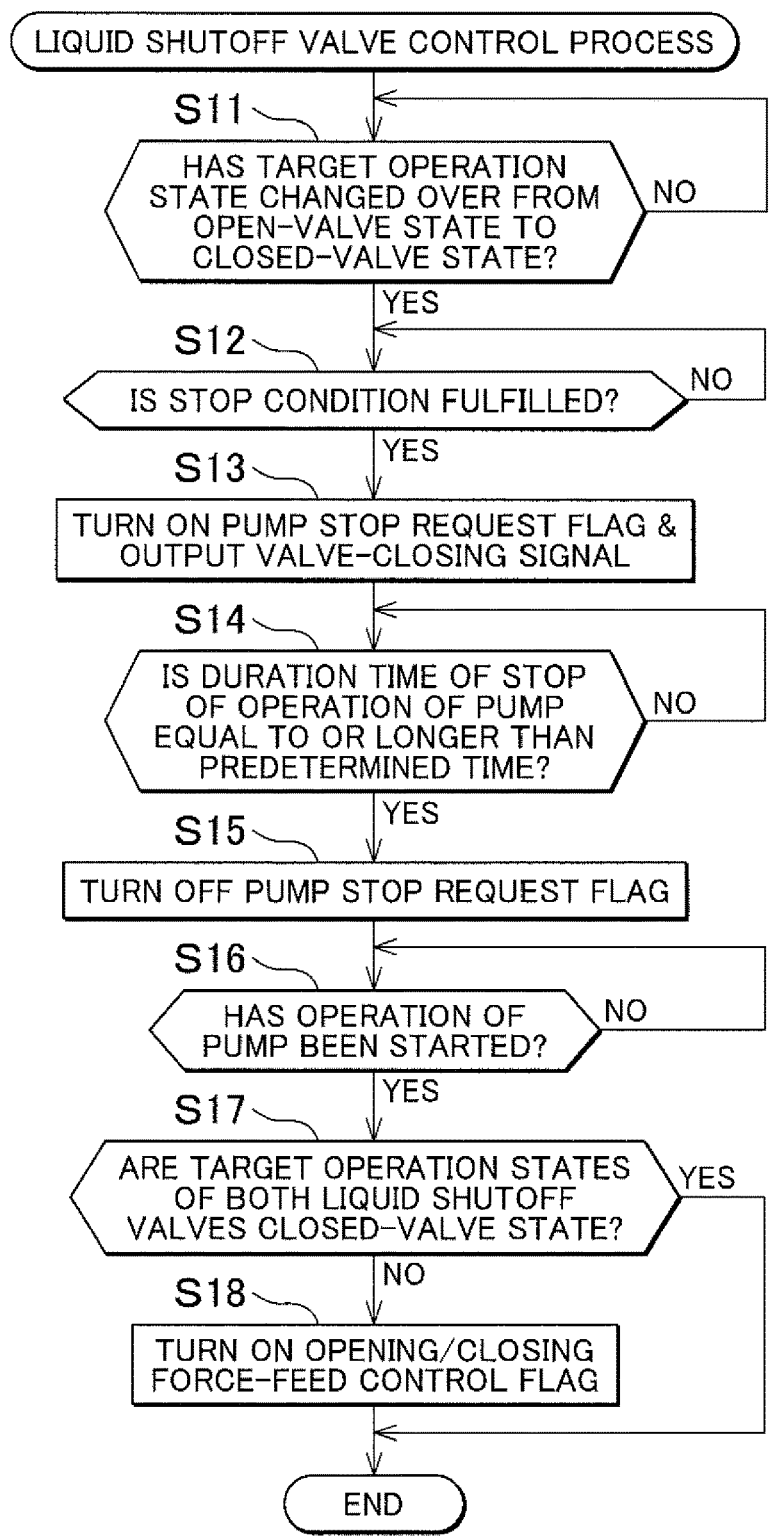
FIG. 4 is a flowchart showing an execution procedure of a control process of each of the liquid shutoff valves.

As shown in FIG. 4, first of all in this liquid shutoff valve control process, it is determined whether or not at least one of the target operation states of the liquid shutoff valves 26 and 27 has changed over from the valve-open state to the valve-closed state (step S11). In the processing procedure of S11, in the case where the target operation state of the liquid shutoff valve 26 (or the liquid shutoff valve 27) at the time of the last execution of the present process is the open-valve state and the target operation state of the liquid shutoff valve 26 (or the liquid shutoff valve 27) at the time of the current execution of the present process is the closed-valve state, it is determined that the target operation state has changed over from the open-valve state to the closed-valve state.

Then, if at least one of the target operation states of the liquid shutoff valves 26 and 27 changes over from the valve-open state to the closed-valve state (YES in step S11), it is determined whether or not a condition for stopping the electric water pump 17 is fulfilled (step S12). It is determined herein that the stop condition is fulfilled, when one of the following (condition (i)) and the following (condition (ii)) is fulfilled. Incidentally, as the (condition (i)) and the (condition (ii)), conditions that make it possible to adequately determine that the temperature of cooling liquid is unlikely to excessively rise when the operation of the electric water pump 17 is stopped are determined in advance. The (condition (i)) is that the outlet liquid temperature TO is lower than a predetermined temperature (105° C. in the present embodiment). The (condition (ii)) is that the outlet liquid temperature TO is equal to or higher than the predetermined temperature (105° C. in the present embodiment) and an engine operating state other than a high-rotation high-load operating state has been continued for a time equal to or longer than a predetermined time (several seconds in the present embodiment).

Then, if the stop condition is fulfilled (YES in step S12), a pump stop request flag is operated to be turned on, and a valve-closing signal is output to that one of the valve driving circuits 26*a* and 27*a* which corresponds to that one of the liquid shutoff valves 26 and 27 whose target operation state is the closed-valve state (step S13).

When the pump stop request flag is operated to be turned on, a signal indicating this information is output to the pump control unit 35*a*. Then, when the signal is input to the pump control unit 35*a*, the operation of the electric water pump 17 is stopped by the pump control unit 35*a*, and the force-feed of cooling liquid by the electric water pump 17 is stopped.

In the processing procedure of step S13, the signal output to the valve driving circuit that is connected to the liquid shutoff valve whose target operation state has changed over from the open-valve state to the closed-valve state is changed over from a valve-opening signal to a valve-closing signal. Besides, a valve-opening signal continues to be output to the valve driving circuit that is connected to the liquid shutoff valve whose target operation state remains the open-valve state, and a valve-closing signal continues to be output to the valve driving circuit that is connected to the liquid shutoff valve whose target operation state remains the closed-valve state. Moreover, the valve driving circuit to which the valve-closing signal is input does not supply an electric current to the coil 55*b* of the liquid shutoff valve that is connected to the circuit, and does not energize the coil 55*b*. On the other hand, the valve driving circuit to which the valve-opening signal is input supplies an electric current to the coil 55*b* of the liquid shutoff valve that is connected to the circuit, and energizes the coil 55*b*. Accordingly, the liquid shutoff valve 26 (or 27) that is changed over from the open-valve state to the closed-valve state has the coil 55*b* whose energization state changes over from a state where the coil 55*b* is not energized to a state where the coil 55*b* is energized.

Through the processing procedure of this step S13, the energization state of the coil 55*b* of that one of the liquid shutoff valves 26 and 27 whose target operation state is the closed-valve state becomes a state where the coil 55*b* is energized. Therefore, the valve body 53 of the liquid shutoff valve is seated on the valve seat 52 and closed by the urging force of the coil spring 54 and the suction force resulting from the magnetic force generated by the electromagnet 55.

After that, it is determined whether or not a duration time of stop of the operation of the electric water pump 17 is equal to or longer than a predetermined time (200 milliseconds in the present embodiment) (step S14). Incidentally, in the present embodiment, a stop time of the electric water pump 17 that makes it possible to definitely close the liquid shutoff valve whose target operation state is the closed-valve state is obtained in advance based on results of various experiments and simulations, and a shortest value of the stop time is stored in the electronic control unit 35 as the aforementioned predetermined time, Besides, in the present embodiment, it is determined that the operation of the electric water pump 17 is stopped when a pump rotational speed NP is lower than a predetermined speed JN (170 rotations per minute in the present embodiment).

Then, if the duration time of stop of the operation of the electric water pump 17 becomes equal to or longer than the predetermined time, the pump stop request flag is operated to be turned off (step S15). Thus, the operation of the electric water pump 17 is resumed through pump control.

After that, it is determined whether or not the operation of the electric water pump 17 has actually been started through pump control (step S16). In this case, the start of operation of the electric water pump 17 is detected when the pump rotational speed NP at the time of the last execution of the present process is lower than the predetermined speed JN and the pump rotational speed NP at the time of the current execution of the present process is equal to or higher than the predetermined speed JN.

If it is determined that the operation of the electric water pump 17 has been started (YES in step S16), it is determined whether or not both the target operation states of the liquid shutoff valves 26 and 27 are the closed-valve state (step S17). Then, if only one of the target operation states of the liquid shutoff valves 26 and 27 is the closed-valve state (NO in step S17), an opening-closing force-feed control flag is operated to be turned on (step S18), and then the present process is ended. On the other hand, if both the target operation states of the liquid shutoff valves 26 and 27 are the closed-valve state (YES in step S17), the processing procedure of step S18 is skipped, and the present processing is ended.

Next, an execution procedure of a process regarding pump control (a pump control process) will be described with reference to FIG. 5. Incidentally, a series of processing procedures shown in the flowchart of FIG. 5 conceptually indicate an execution procedure of the pump control process. The actual process is executed as interrupt handling on a predetermined cycle, by the pump control unit 35a of the electronic control unit 35. This pump control process is executed as part of pump control.

Figure 5:
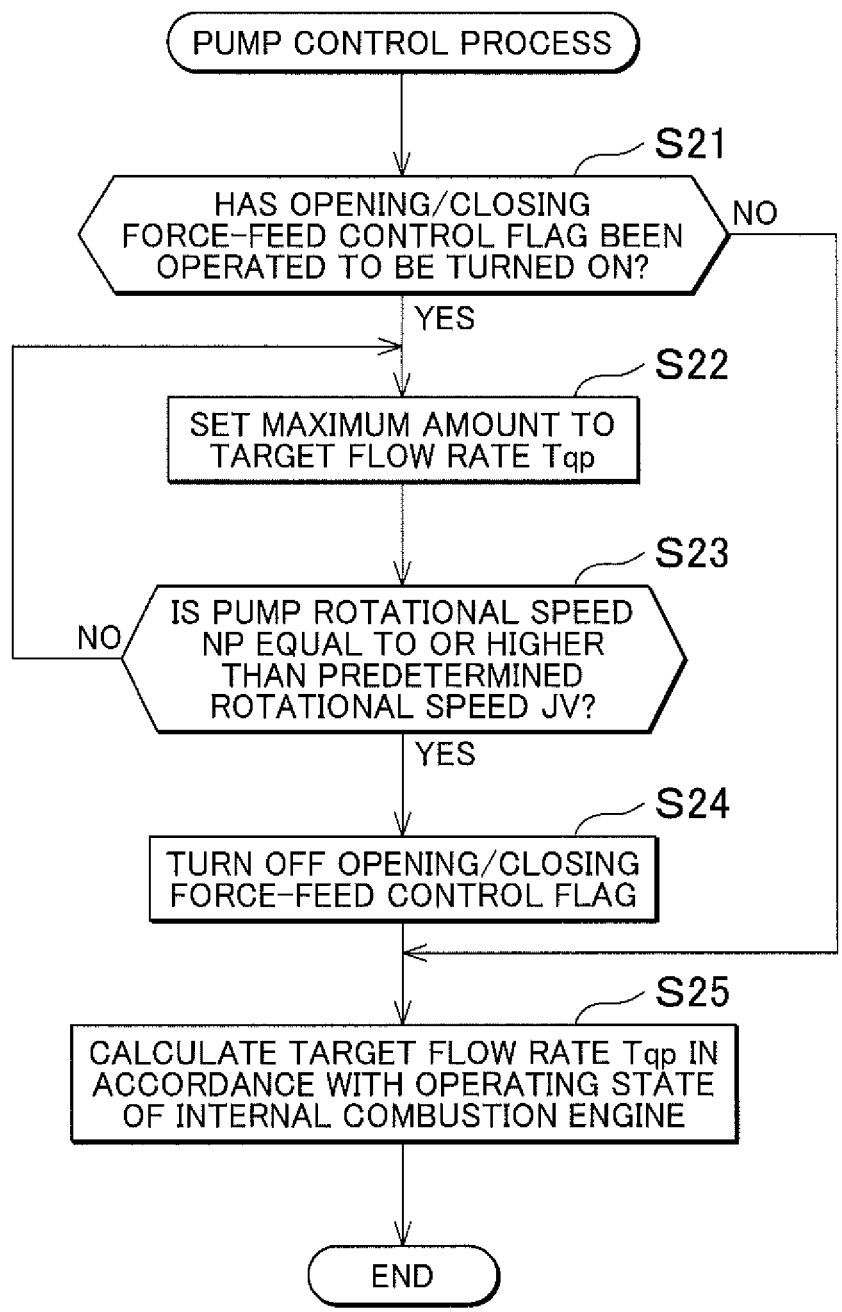
FIG. 5 is a flowchart showing an execution procedure of a pump control process of the cooling liquid circulation device.

As shown in FIG. 5, first of all in this process, it is determined whether or not the opening-closing force-feed control flag has been operated to be turned on (step S21). If the opening-closing force-feed control flag has been operated to be turned off (NO in step S21), the target flow rate Tqp is calculated in accordance with an operating state of the internal combustion engine 10 (step S25).

If the opening-closing force-feed control flag has been operated to be turned on (YES in step S21), a maximum amount of a variable range of a force-feed amount of the electric water pump 17 is determined as the target flow rate Tqp (step S22). Thus, the duty ratio of a command signal that is output from the pump control unit 35a of the electronic control unit 35 to the pump driving circuit 17a is set to "100%", and opening-closing force-feed control for driving the electric water pump 17 is performed.

As described hitherto, in the present embodiment, the pump control unit 35a performs opening-closing force-feed control in the case where the opening-closing force-feed control flag has been operated to be turned on. Then, as described above, if the valve control unit 35b detects the start of operation of the electric water pump 17 when the target operation state of one of the liquid shutoff valves is the open-valve state, the opening-closing force-feed control flag is operated to be turned on by the valve control unit 35b. That is, in the present embodiment, the pump control unit 35a is caused to perform opening-closing force-feed control by performing an operation of turning on the opening-closing force-feed control flag when the valve control unit 35b detects the start of operation of the electric water pump 17.

Then, it is determined whether or not the pump rotational speed NP has become equal to or higher than a predetermined rotational speed JV (3000 rotations per minute in the present embodiment) (step S23). In the present embodiment, a pump rotational speed VP (specifically, a speed range thereof) that allows the liquid shutoff valve A whose coil 55b is not energized to be held closed is obtained in advance based on results of various experiments and simulations conducted by the inventors. A rotational speed that is higher than an upper-limit of the pump rotational speed VP is stored in the electronic control unit 35 as the aforementioned predetermined rotational speed JV Until the pump rotational speed NP becomes equal to or higher than the predetermined rotational speed JV (NO in step S23), the aforementioned maximum amount is determined as the target flow rate Tqp (step S22). Then, when the pump rotational speed NP becomes equal to or higher than the predetermined rotational speed JV (YES in step S23), the opening-closing force-feed control flag is operated to be turned off (step S24), and the target flow rate Tqp is calculated in accordance with the operating state of the internal combustion engine 10 (step S25). Then, after that, until the opening-closing force-feed control flag is operated to be turned on (NO in step S21), the calculation of the target flow rate Tqp corresponding to the operating state of the internal combustion engine 10 is repeatedly carried out (step S25).

(Operation) The operation resulting from the performance of opening-closing force-feed control will be described hereinafter. FIGS. 6A to 6G show an exemplary execution mode of the liquid shutoff valve control process and the pump control process in the case where only the liquid shutoff valve 27 is closed from a state where both the liquid shutoff valves 26 and 27 are open.

In the example shown in FIGS. 6A to 6G, before a time point t11, a command signal (FIG. 6A) that is output from the pump control unit 35a of the electronic control unit 35 to operate the electric water pump 17 has been input to the pump driving circuit 17a. Thus, the electric water pump 17 is rotationally driven, and the force-feed of cooling liquid by the electric water pump 17 is carried out. Besides, the coil 55b of each of the liquid shutoff valves 26 and 27 is not energized, and the liquid shutoff valves 26 and 27 are open (FIGS. 6C and 6F). Therefore, cooling liquid is delivered to the liquid channel 22 having the heater core 24 and the liquid channel 23 having the ATF warmer 25. Furthermore, as idling operation of the internal combustion engine 10 is continued, the temperature of cooling liquid gradually falls, and the temperature of the cooling liquid passing through the heater core 24 (FIG. 6E) also gradually falls, Then, at the time point t11, with a view to restraining the heating performance from decreasing as a result of a fall in the temperature of cooling liquid, the target operation state of the liquid shutoff valve 27 becomes the closed-valve state, and the delivery of cooling liquid in the ATF warmer 25 is stopped. Specifically, the operation of the electric water pump 17 is stopped, and the coil 55b of the liquid shutoff valve 27 is energized.

At and after the time point t11, the pump rotational speed NP (FIG. 6B) falls to become equal to "0", and the flow rate of the cooling liquid passing through the liquid channel 22 (the heater core 24) (FIG. 6D) and the flow rate of the cooling liquid passing through the liquid channel 23 (the ATF warmer 25) (FIG. 6G) also become equal to "0". Thus, the valve body 53 of each of the liquid shutoff valves 26 and 27 is displaced in the valve-closing direction and seated on the valve seat 52 by the urging force of the coil spring 54, so the liquid shutoff valves 26 and 27 are closed. At this moment, the valve body 53 of the liquid shutoff valve 27 is suctioned by the magnetic force generated by the electromagnet 55. Incidentally, at this moment, the temperature of cooling liquid in the heater core 24 continues to fall.

Then, at a time point 12, when the duration time of stop of the electric water pump 17 reaches a predetermined time, the operation of the electric water pump 17 is started, and the performance of opening-closing force-feed control is started. Specifically, the amount (specifically, the target flow rate Tqp) of the cooling liquid force-fed by the electric water pump 17 is determined as the maximum amount of the variable range, and the duty ratio of a command signal that is output to the pump driving circuit 17a from the pump control unit 35a of the electronic control unit 35 becomes equal to "100%". Thus, at and after the time point t12, the pump rotational speed NP swiftly rises, and the amount of the cooling liquid force-fed by the electric water pump 17 swiftly increases. Therefore, the valve body 53 of the liquid shutoff valve 26 whose coil 55b is not energized is swiftly displaced in the valve-opening direction by the flow momentum of cooling liquid. In the present example, the liquid shutoff valve 26 is definitely opened at a timing (at a time point t13) when the pump rotational speed NP becomes equal to the predetermined rotational speed JV. Thus, cooling liquid starts flowing inside the liquid channel 22 having the heater core 24.

When the pump rotational speed NP reaches the predetermined rotational speed JV during the performance of opening-closing force-feed control (at the time point t13), the performance of the opening-closing force-feed control is stopped. Then, after that, the target flow rate Tqp is calculated in accordance with the operating state of the internal combustion engine 10, and the command signal that is output to the pump driving circuit 17a from the pump control unit 35a of the electronic control unit 35 is also adjusted in accordance with the operating state of the internal combustion engine 10.

As described hitherto, in the cooling liquid circulation device according to the present embodiment, if the pump rotational speed NP reaches the predetermined rotational speed JV after the operation of the electric water pump 17 is resumed, the performance of opening-closing force-feed control is stopped on the assumption that the liquid shutoff valve 27 is not closed as long as normal pump control is performed. Thus, the performance of opening-closing force-feed control can be stopped at a timing when the adjustment of the amount of the cooling liquid force-fed by the electric water pump 17 with a view to opening the liquid shutoff valve 27 whose coil 55b is not energized becomes unnecessary.

When opening-closing force-feed control is performed, the maximum amount of the range where the force-feed amount of the electric water pump 17 can be varied is determined as the target flow rate Tqp. Thus, the amount of the cooling liquid force-fed by the electric water pump 17 is adjusted to the maximum amount of the variable range. On the other hand, when normal pump control is performed without performing opening-closing force-feed control, the force-feed amount of cooling liquid at which the cooling liquid circulation device performs a desired cooling function (a function performing force-feed amount) is calculated, as the target flow rate Tqp, in accordance with the operating state of the internal combustion engine 10. Then, based on this target flow rate Tqp, the amount of the cooling liquid force-fed by the electric water pump 17 is adjusted within the variable range. Therefore, it is safe to assume that the amount of the cooling liquid force-fed by the electric water pump 17 is often larger when opening-closing force-feed control is performed than when normal pump control is performed. In the cooling liquid circulation device according to the present embodiment, opening-closing force-feed control is restrained from being performed unnecessarily. Therefore, the amount of the cooling liquid force-fed by the electric water pump 17 can be restrained from becoming unnecessarily large, so the amount of the electric power consumed by the electric water pump 17 and hence the amount of the fuel consumed by the internal combustion engine 10 can be restrained from increasing.

Incidentally, when the liquid shutoff valve 27 whose coil 55b is not energized is temporarily opened as the operation of the electric water pump 17 is resumed, the distance between the electromagnet 55 and the valve body 53 of the liquid shutoff valve 27 becomes long, and the suction force that is applied to the valve body 53 due to residual magnetization becomes small. Besides, in the present embodiment, the urging force of the coil spring 54 is determined such that the opening degree of that one of the liquid shutoff valves 26 and 27 whose coil 55b is not energized is held equal to a maximum opening degree (a fully-open opening degree) even in the case where the amount of the cooling liquid force-fed by the electric water pump 17 becomes equal to a minimum amount in the variable range, when that one of the liquid shutoff valves 26 and 27 whose coil 55b is not energized is temporarily opened. Therefore, in the present example, even when the amount of the cooling liquid force-fed by the electric water pump 17 becomes small after the liquid shutoff valve 27 whose coil 55b is not energized is temporarily opened, the liquid shutoff valve 27 is prevented from being closed by the suction force resulting from residual magnetization or the urging force of the coil spring 54. Accordingly, even if the performance of opening-closing force-feed control is stopped when the pump rotational speed NP reaches the predetermined rotational speed JV as in the case of the cooling liquid circulation device according to the present embodiment, the liquid shutoff valve 27 whose coil 55b is not energized can be held open.

Then in the present example, at and after the time point t13, the flow rate of the cooling liquid passing through the liquid channel 22 having the heater core 24 gradually increases. At this moment, the liquid shutoff valve 27 is held closed, so cooling liquid does not flow inside the liquid channel 23 having the ATF warmer 25. Accordingly, the temperature of the cooling liquid in the cooling liquid passages is restrained from falling as a result of the release of heat from the cooling liquid in the ATF warmer 25, and the temperature of the cooling liquid circulating in the cooling liquid passages becomes correspondingly high. Therefore, the temperature of the cooling liquid passing through the liquid channel 22 (the heater core 24) also becomes high. Accordingly, the heating performance can be enhanced in comparison with the time when the liquid shutoff valve 27 is open. Incidentally, alternate long and short dash lines in FIGS. 6D and 6E indicate a comparative example in which the liquid shutoff valve 26 cannot be opened and remains closed because opening-closing force-feed control is not performed. In this comparative example, at and after the time point t13, the liquid shutoff valve 26 is not opened, and cooling liquid does not flow in the liquid channel 22 having the heater core 24. Therefore, cooling liquid stagnates inside the heater core 24, and the temperature of the cooling liquid continues to fall.

Incidentally, in the present embodiment, in the case where the start of operation of the electric water pump 17 is detected (YES in step S16 of FIG. 4), if the target operation states of the respective liquid shutoff valves 26 and 27 are the closed-valve state (YES in step S17) and the coils 55b of the liquid shutoff valves 26 and 27 are energized, opening-closing force-feed control (step S22 of FIG. 5) is not performed. Thus, in the case where there is no need to perform opening-closing force-feed control as there is no liquid shutoff valve that should be opened when the operation of the electric water pump 17 is resumed, opening-closing force-feed control is not performed. Therefore, the opening-closing force-feed control can be restrained from being performed unnecessarily, and the amount of the cooling liquid force-fed by the electric water pump 17 can be restrained from becoming unnecessarily large.

As described above, according to the present embodiment, the following effects are obtained. (1) If the target operation state of one of the liquid shutoff valves is the open-valve state when the start of operation of the electric water pump 17 is detected, opening-closing force-feed control is performed. Moreover, the amount of the cooling liquid force-fed by the electric water pump 17 is set to an amount within such a range that the valve body 53 of that one of the liquid shutoff valves 26 and 27 whose coil 55b is energized is not displaced in the valve-opening direction while the valve body 53 of that one of the liquid shutoff valves 26 and 27 whose coil 55b is not energized is displaced in the valve-opening direction, through opening-closing force-feed control. Therefore, the open-closed states of the respective liquid shutoff valves 26 and 27 can be swiftly changed over to their desired states by opening the liquid shutoff valve A that should be opened and closing the liquid shutoff valve B that should be closed.

(2) In the case where the coils 55b of the respective liquid shutoff valves 26 and 27 are energized when the start of operation of the electric water pump 17 is detected, normal pump control is performed without performing opening-closing force-feed control. Thus, opening-closing force-feed control can be restrained from being performed unnecessarily.

Opening-closing force-feed control is performed by setting the amount of the cooling liquid force-fed by the electric water pump 17 to the maximum amount of the variable range. Therefore, the valve body 53 of the liquid shutoff valve A whose coil 55b is not energized can be swiftly displaced in the valve-opening direction by the flow momentum of cooling liquid. In addition, the magnetic force generated by the electromagnet 55 of each of the liquid shutoff valves 26 and 27 is set in advance in such a manner as to generate a suction force that prevents the valve body 53 of each of the liquid shutoff valves 26 and 27 from being displaced in the valve-opening direction when opening-closing force-feed control is performed. Therefore, if the coil 55b of the liquid shutoff valve B is energized, the valve body 53 of the liquid shutoff valve B is not displaced in the valve-opening direction by the suction force resulting from the magnetic force generated by the electromagnet 55. Accordingly, the liquid shutoff valve B whose coil 55b is energized can be held closed when opening-closing force-feed control is performed.

(4) When the pump rotational speed NP reaches the predetermined rotational speed JV during the performance of opening-closing force-feed control, the performance of opening-closing force-feed control is stopped, and normal pump control is performed. Thus, the performance of opening-closing force-feed control can be stopped at a timing when the adjustment of the amount of the cooling liquid force-fed by the electric water pump 17 with a view to opening the liquid shutoff valve 27 whose coil 55b is not energized becomes unnecessary.

Incidentally, the aforementioned embodiment may be carried out after being modified as follows. The timing for stopping the performance of opening-closing force-feed control is not limited to the timing when the pump rotational speed NP reaches a speed equal to or higher than the predetermined rotational speed JV. An arbitrary timing can be determined as the timing for stopping the performance of opening-closing force-feed control, as long as that one of the liquid shutoff valves 26 and 27 whose coil 55b is not energized is definitely opened during the performance of opening-closing force-feed control. As such a timing, for example, a timing when the amount of the cooling liquid force-fed by the electric water pump 17 per unit time becomes equal to or larger than a predetermined amount, a timing when the duration time of operation after the resumption of operation of the electric water pump 17 becomes equal to or longer than a predetermined time, or the like can be determined.

The amount of the cooling liquid force-fed by the electric water pump 17 is not absolutely required to be set to the maximum amount of the variable range in opening-closing force-feed control. For example, the amount of the cooling liquid force-fed by the electric water pump 17 can be set to 80% of the maximum amount or 50% of the maximum amount In short, it is sufficient that the amount of cooling liquid that allows the liquid shutoff valve A whose coil 55b is not energized to be definitely opened can be force-fed by the electric water pump 17 through the performance of opening-closing force-feed control.

In this case, the amount of the cooling liquid force-fed by the electric water pump 17 in opening-closing force-feed control can be determined as follows. It is assumed that a target flow rate corresponding to the operating state of the internal combustion engine 10 is denoted by "Tr", and an amount of the cooling liquid force-fed by the electric water pump 17 that allows the liquid shutoff valve A whose coil 55b is not energized to be definitely opened is denoted by "Jr". When the target flow rate Tr is smaller than the force-feed amount Jr at the time of the performance of opening-closing force-feed control, the force-feed amount Jr is determined as the target flow rate Tqp. On the other hand, when the target flow rate Tr is equal to or larger than the force-feed amount Jr, the target flow rate Tr is determined as the target flow rate Tqp. The aforementioned liquid shutoff valve A can be definitely opened by setting the target flow rate Tqp to the force-feed amount Jr when the target flow rate Tr is smaller than the force-feed amount Jr, through the performance of this opening-closing force-feed control. In addition, when the target flow rate Tr is equal to or larger than the force-feed amount Jr, the target flow rate Tqp is set to the target flow rate Tr. Thus, the amount of the cooling liquid force-fed by the electric water pump 17 at this time can be set to the function performing force-feed amount, and the aforementioned liquid shutoff valve A can be definitely opened.

The processing procedure of step S17 of the liquid shutoff valve control process (FIG. 4) may be omitted. In this case, even if the coils 55b of both the liquid shutoff valves 26 and 27 are energized when the start of operation of the electric water pump 17 is detected, the valve control unit 35b performs an operation of turning on the opening-closing force-feed control flag. That is, even in the case where the coils 55b of both the liquid shutoff valves 26 and 27 are energized when the start of operation of the electric water pump 17 is detected, the valve control unit 35b causes the pump control unit 35a to perform opening-closing force-feed control. Even this cooling liquid circulation device can perform opening-closing force-feed control in resuming the operation of the electric water pump 17. Therefore, the open-closed states of the respective liquid shutoff valves 26 and 27 can be swiftly changed over to their desired states by opening the liquid shutoff valve A that should be opened, and closing the liquid shutoff valve B that should be closed.

After being appropriately modified, the configuration of the cooling liquid circulation device according to the aforementioned embodiment can also be applied to a cooling liquid circulation device having three or more liquid shutoff valves that are separately provided in liquid channels that are connected in parallel to one another. Besides, in the case where this modified configuration is applied the cooling liquid circulation device having the three or more liquid shutoff valves, the amount of the cooling liquid force-fed by the electric water pump 17 in opening-closing force-feed control may be increased as the number of liquid shutoff valves A that should be opened increases, in resuming the operation of the electric water pump 17. As the number of liquid shutoff valves A that should be opened increases, the amount of cooling liquid circulating in the cooling liquid passages also increases, so the amount of the cooling liquid force-fed by the electric water pump 17 that is needed to make the flow momentum of cooling liquid applied to the liquid shutoff valves A equal to or higher than a predetermined level also increases. Therefore, if the amount of the cooling liquid force-fed by the electric water pump 17 in opening-closing force-feed control is increased as the number of liquid shutoff valves A that should be opened increases, the amount of the cooling liquid force-fed by the electric water pump 17 can be determined in accordance with such circumstances. As a result, the force-feeding of cooling liquid by the electric water pump 17 in opening-closing force-feed control can be efficiently carried out.

The cooling liquid circulation device according to the aforementioned embodiment is not absolutely required to be a cooling liquid circulation device that is provided with the rotary electric water pump 17. The configuration of the cooling liquid circulation device according to the aforementioned embodiment can be applied to any cooling liquid circulation device that is provided with a variable flow rate-type water pump capable of arbitrarily changing the force-feed amount of cooling liquid. As such a variable flow rate-type water pump, for example, a swash plate-type water pump that is driven by the output shaft of the internal combustion engine 10, a water pump having a flow rate control valve that adjusts the force-feed amount of cooling liquid, or the like can be mentioned.

The configuration of the cooling liquid circulation device according to the aforementioned embodiment can also be applied to a cooling liquid circulation device equipped with a liquid shutoff valve that is provided with a spring other than the coil spring 54, such as a plate spring or the like, as a spring member that constantly urges a valve body in the valve-closing direction.

What is claimed is:

1. A cooling liquid circulation device for an internal combustion engine provided with a plurality of cooling liquid passages which are connected in parallel to one another and through which cooling liquid for the internal combustion engine circulates, the cooling liquid circulation device comprising:
   a pump that is configured to force-feed cooling liquid in the cooling liquid passages at a variable flow rate;
   control valves that are provided separately in the plurality of the cooling liquid passages, each of the control valves being configured to block up a corresponding one of the cooling liquid passages, and each of the control valves including a valve body, a spring member and an electromagnet, the valve body being configured to be urged in a valve-opening direction by a flow momentum of cooling liquid, the spring member being configured to constantly urge the valve body in a valve-closing direction, and the electromagnet including a core and a coil and configured to generate a magnetic force for suctioning the valve body in the valve-closing direction; and
   an electronic control unit that is configured to
   (i) make a changeover, for each of the control valves, between a state where the coil is energized and a state where the coil is not energized,
   (ii) stop operation of the pump and seat the valve body by an urging force of the spring member, in making a changeover from an open-valve state of each of the control valves to a closed-valve state of each of the control valves,
   (iii) change over an energization state at a time when the coil of each of the control valves changes over each of the control valves to the closed-valve state from the state where the coil is not energized to the state where the coil is energized, and resume operation of the pump,
   (iv) perform opening-closing force-feed control where the pump is operating and the coil of at least one of the control valves is not energized, the opening-closing force-feed control being a control for setting an amount of cooling liquid force-fed by the pump to a force-feed amount within such a range that the valve body of at least another one of the control valves whose coil is energized is not displaced in the valve-opening direction while the valve body of the at least one of the control valves whose coil is not energized is displaced in the valve-opening direction regardless of an operating state of the internal combustion engine, when the electronic control unit detects start of operation of the pump, and
   (v) control operation of the pump in accordance with the operating state of the internal combustion engine.

2. The cooling liquid circulation device according to claim 1, wherein
   the electronic control unit is configured to control operation of the pump in accordance with the operating state of the internal combustion engine without performing the opening-closing force-feed control, when the electronic control unit detects the start of operation of the pump and the coils of all the control valves are energized.

3. The cooling liquid circulation device according to claim 1, wherein
the electronic control unit is configured to perform the opening-closing force-feed control by setting the amount of cooling liquid force-fed by the pump to a maximum amount of a variable range, and
the electronic control unit is configured to, when the electronic control unit performs the opening-closing force-feed control, set the magnetic force generated by the electromagnet at a time when the coil is energized, such that each of the control valves generates a suction force that prevents the valve body of each of the control valves from being displaced in the valve-opening direction.

4. The cooling liquid circulation device according to claim 1, wherein
the pump is a rotary pump, and
the electronic control unit is configured to: when a rotational speed of the pump reaches a predetermined rotational speed that is higher than an upper-limit of the rotational speed of the pump that allows at least one of the control valves whose coil is not energized to be held closed, during performance of the opening-closing force-feed control,
(i) stop performance of the opening-closing force-feed control, and
(ii) control operation of the pump in accordance with the operating state of the internal combustion engine.

* * * * *